US011287530B2

(12) United States Patent
Baek et al.

(10) Patent No.: US 11,287,530 B2
(45) Date of Patent: Mar. 29, 2022

(54) DATA PROCESSING SYSTEM AND METHOD FOR FUSION OF MULTIPLE HETEROGENEOUS SENSORS

(71) Applicant: ThorDrive Co., Ltd, Seoul (KR)

(72) Inventors: Doo San Baek, Seoul (KR); Woosol Hur, Seoul (KR)

(73) Assignee: THORDRIVE CO., LTD, Seoul (KR)

( * ) Notice: Subject to any disclaimer, the term of this patent is extended or adjusted under 35 U.S.C. 154(b) by 411 days.

(21) Appl. No.: 16/561,882

(22) Filed: Sep. 5, 2019

(65) Prior Publication Data

US 2021/0072390 A1  Mar. 11, 2021

(51) Int. Cl.
| | |
|---|---|
| G06K 9/00 | (2006.01) |
| G01S 17/89 | (2020.01) |
| G05D 1/02 | (2020.01) |
| G01S 7/00 | (2006.01) |
| G01S 17/931 | (2020.01) |

(52) U.S. Cl.
CPC .............. *G01S 17/89* (2013.01); *G01S 7/003* (2013.01); *G01S 17/931* (2020.01); *G05D 1/0248* (2013.01); *G06K 9/00825* (2013.01)

(58) Field of Classification Search
CPC ........ G01S 17/89; G01S 7/003; G01S 17/931; G01S 17/66; G01S 17/86; G01S 17/87; G05D 1/0248; G05D 1/0257; G05D 2201/0213; G06K 9/00825; G06K 9/00201; B60W 40/02; B60W 40/105; B60W 60/001; B60W 2050/0052; B60W 2420/42; B60W 2420/52; B60W 2420/62; B60W 2420/90; B60W 2520/10; B60W 2554/00; B60W 2556/35; B60R 21/0134; G06T 5/002; G06T 7/246; B60Y 2400/301
USPC ......................................................... 382/154
See application file for complete search history.

(56) References Cited

U.S. PATENT DOCUMENTS

| | | | | |
|---|---|---|---|---|
| 2002/0141356 | A1* | 10/2002 | Beidas ................. | H04B 7/2125 370/324 |
| 2004/0177285 | A1 | 9/2004 | Klotz et al. | |
| 2012/0044476 | A1* | 2/2012 | Earhart ................... | G01S 17/58 356/4.01 |
| 2012/0287341 | A1* | 11/2012 | Choi ........................ | H04N 5/04 348/500 |

(Continued)

FOREIGN PATENT DOCUMENTS

| | | | |
|---|---|---|---|
| CN | 101159812 A | * | 4/2008 |
| CN | 105426583 A | * | 3/2016 |

(Continued)

*Primary Examiner* — Mahendra R Patel
(74) *Attorney, Agent, or Firm* — Goldilocks Zone IP Law

(57) ABSTRACT

Disclosed is a data processing system and method for the fusion of multiple heterogeneous sensors. The data processing system and method may synchronize the first merged sensing signal with the second sensing signal by performing origin time shifting (OTS) and tracklet movement compensation (TMC). Namely, it is possible to perform time synchronization to the heterogeneous sensors by post-processing data without synchronizing the data acquisition time points through a trigger. Also, the data processing system removes the noise points caused by direct and indirect interference included in the first sensing signal, thereby providing more accurate sensing signal data.

17 Claims, 14 Drawing Sheets

(56) References Cited

U.S. PATENT DOCUMENTS

| | | | | |
|---|---|---|---|---|
| 2013/0148845 A1* | 6/2013 | Maeda | | G01S 17/89 |
| | | | | 382/103 |
| 2014/0195138 A1* | 7/2014 | Stelzig | | G08G 1/0116 |
| | | | | 701/119 |
| 2015/0139281 A1* | 5/2015 | Ho | | H04B 1/708 |
| | | | | 375/149 |
| 2017/0331614 A1* | 11/2017 | Vartiovaara | | H04J 3/0667 |
| 2018/0128920 A1* | 5/2018 | Keilaf | | G01S 7/497 |
| 2018/0143307 A1* | 5/2018 | Steinberg | | G01S 7/4861 |
| 2018/0367871 A1* | 12/2018 | Zeng | | G01S 17/89 |
| 2019/0086546 A1* | 3/2019 | Tsishkou | | G06T 7/521 |
| 2019/0098233 A1 | 3/2019 | Gassend et al. | | |
| 2019/0120955 A1* | 4/2019 | Zhong | | G01S 13/584 |
| 2019/0243020 A1* | 8/2019 | Olsson | | G01S 17/08 |
| 2019/0271769 A1* | 9/2019 | Raly | | G01S 7/4814 |
| 2020/0005097 A1* | 1/2020 | Sinclair | | G01S 13/865 |

FOREIGN PATENT DOCUMENTS

| | | | | |
|---|---|---|---|---|
| CN | 109858512 A | * | 6/2019 | ......... G06K 9/00791 |
| KR | 10-2017-0124287 A | | 11/2017 | |
| KR | 20170124287 A | * | 11/2017 | |
| KR | 10-2019-0049871 A | | 5/2019 | |
| KR | 10-2019-0055267 A | | 5/2019 | |
| WO | 2018/093613 A1 | | 5/2018 | |

\* cited by examiner

DATA PROCESSING SYSTEM AND METHOD FOR FUSION OF MULTIPLE HETEROGENEOUS SENSORS

BACKGROUND

1. Field

The present disclosure relates to a data processing system and method of multiple heterogeneous sensors applied to an ego vehicle system, and more particularly, to a data processing system and method for performing data processing for the fusion of heterogeneous sensors comprising different acquisition time points and/or different sensing signal acquisition manners and removing the interference between the sensors.

2. Description of the Related Art

An ego vehicle system and an ADAS system use multiple heterogeneous sensors to acquire position information of a running vehicle and information about surrounding environment. The multiple heterogeneous sensors may include stereo cameras, 3D-LiDAR, IMU, DGPS and the like. Using various sensors of different types may cause problems that are not caused in using a single sensor.

For example, when multiple sensors are used, interference may occur between signals of the multiple sensors. In addition, the time point for acquiring information about the surrounding environment may be different for each sensor type. Thus, in order to acquire information of the surrounding environment by simultaneously applying different kinds of sensors, it is necessary to synchronize the acquisition time points of the sensors. A method of synchronizing the acquisition time points of the sensors in a hardware base method, for example a method of synchronizing the acquisition time points of the information by means of triggering, may not be easily performed due to the difference in operation methods, structures or the like of the various kinds of sensors. Thus, there is a need for a data processing system and method capable of providing data processing for the fusion of multiple sensors comprising different acquisition time points and removing the interference between the sensors.

SUMMARY

The present disclosure is designed to solve the above problems, and the present disclosure is directed to providing a data processing system and method, which may provide data processing for the fusion of heterogeneous sensors comprising different acquisition time points and/or different sensing signal acquisition manners and remove the interference between the sensors.

In one aspect, there is provided a data processing system for the fusion of multiple heterogeneous sensors, comprising: a plurality of first sensors configured to respectively generate a first sensing signal by sensing a surrounding environment of the vehicle during a first acquisition time period, the first sensing signal comprising a plurality of points including information about a three-dimensional spatial location of the surrounding environment of the vehicle; a second sensor different from the first sensor and configured to generate a second sensing signal by sensing the surrounding environment of the vehicle; a point cloud generation module comprising an merged point cloud generation unit configured to specify an acquisition time point of the plurality of first sensing signals provided by the plurality of first sensors as a first time point within the first acquisition time period, generate a plurality of corrected first sensing signals in which positions of the plurality of points are adjusted based on the specified first time point, and generate a first merged sensing signal by merging the plurality of corrected first sensing signals; a tracking module configured to generate tracklet information by tracking movements of objects around the vehicle based on the first merged sensing signal; and a time synchronization module comprising an origin time shifting (OTS) unit configured to synchronize the acquisition time point of the first sensing signal from the first time point to an acquisition time point of the second sensing signal, and a tracklet movement compensation (TMC) unit configured to compensate for the movements of the objects around the vehicle at the first sensing signal according to the tracklet information.

In another aspect of the present disclosure, there is provided a data processing method for the fusion of multiple heterogeneous sensors, comprising: by a plurality of first sensors, respectively generating a first sensing signal by sensing a surrounding environment of the vehicle during a first acquisition time period, the first sensing signal comprising a plurality of points including information about a three-dimensional spatial location of the surrounding environment of the vehicle; by a second sensor different from the first sensor, generating a second sensing signal by sensing the surrounding environment of the vehicle; by a point cloud generation module, specifying an acquisition time point of the plurality of first sensing signals provided by the plurality of first sensors as a first time point within the first acquisition time period, and generating a plurality of corrected first sensing signals in which positions of the plurality of points are adjusted based on the specified first time point; by the point cloud generation module, generating a first merged sensing signal by merging the plurality of corrected first sensing signals; by a tracking module, generating tracklet information by tracking movements of objects around the vehicle based on the first merged sensing signal; by a time synchronization module, synchronizing the acquisition time point of the first sensing signal from the first time point to an acquisition time point of the second sensing signal; and by the time synchronization module, compensating for the movements of the objects around the vehicle at the first sensing signal according to the tracklet information.

In still another aspect of the present disclosure, there is provided at least one non-temporary computer-readable storage medium that stores computer-readable instructions so that the computer-readable instructions performs the steps of: by a plurality of first sensors, respectively generating a first sensing signal by sensing a surrounding environment of the vehicle during a first acquisition time period, the first sensing signal comprising a plurality of points including information about a three-dimensional spatial location of the surrounding environment of the vehicle; by a second sensor different from the first sensor, generating a second sensing signal by sensing the surrounding environment of the vehicle; by the point cloud generation module, generating a first merged sensing signal by merging the plurality of corrected first sensing signals; by a tracking module, generating tracklet information by tracking movements of objects around the vehicle based on the first merged sensing signal; by a time synchronization module, synchronizing the acquisition time point of the first sensing signal from the first time point to an acquisition time point of the second sensing signal; and by the time synchronization module, compensating for the movements of the objects around the vehicle at the first sensing signal according to the tracklet information.

The data processing system and method for the fusion of multiple heterogeneous sensors according to an embodiment of the present disclosure may synchronize the first merged sensing signal with the second sensing signal by performing origin time shifting (OTS) and tracklet movement compensation (TMC). Thus, the first merged sensing signal and the second sensing signal may be correctly fused without being badly synchronized. That is, it is possible to synchronize time of the heterogeneous sensors by post-processing data without performing synchronization through a separate trigger to the data acquisition time points.

In addition, the data processing system for the fusion of multiple heterogeneous sensors according to an embodiment of the present disclosure may remove noise points caused by direct interference and indirect interference included in the first sensing signal. Thus, more accurate sensing signal data may be generated.

DETAILED DESCRIPTION

Hereinafter, preferred embodiments according to the present disclosure will be described in detail with reference to the accompanying drawings. The detailed description set forth below in conjunction with the accompanying drawings is intended to illustrate exemplary embodiments of the present disclosure and is not intended to represent the only embodiment in which the present disclosure may be implemented. The following detailed description includes specific details in order to provide a thorough understanding of the present disclosure. However, those skilled in the art will recognize that the present disclosure may be implemented without these specific details. Certain terms used in the following description are provided to aid understanding of the present disclosure and may be changed into other terms without departing from the scope of the present disclosure.

Figure 1:
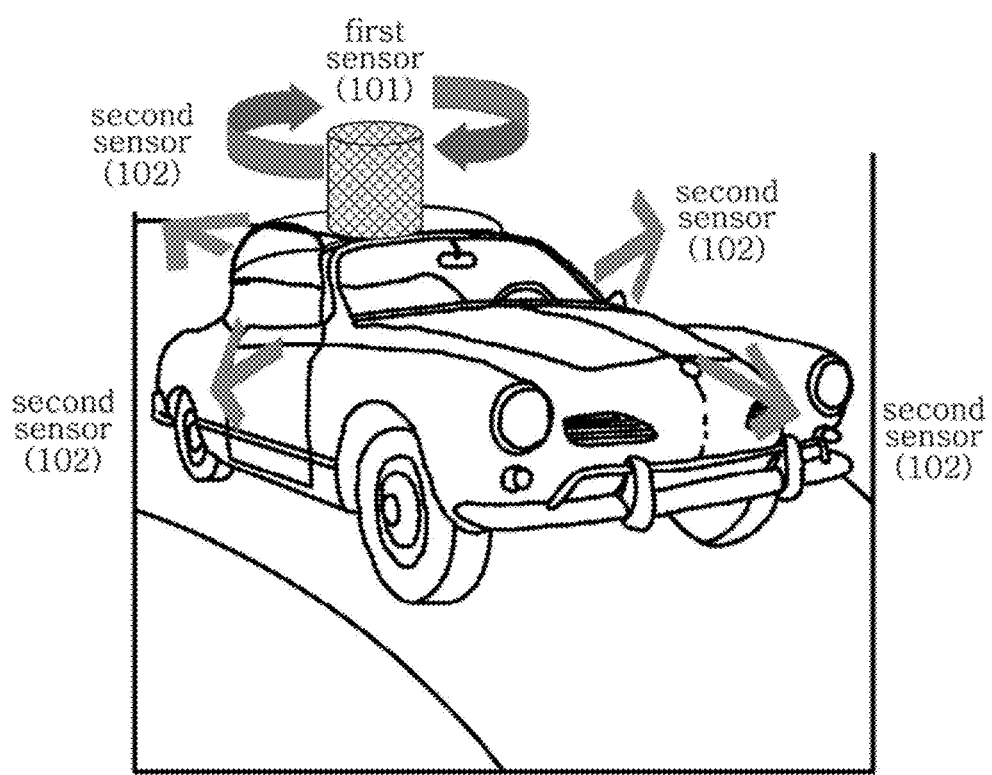
FIG. 1 is a schematic view exemplarily showing an autonomous vehicle to which a data processing system for the fusion of multiple heterogeneous sensors according to an embodiment of the present disclosure is applied.
Figure 2:
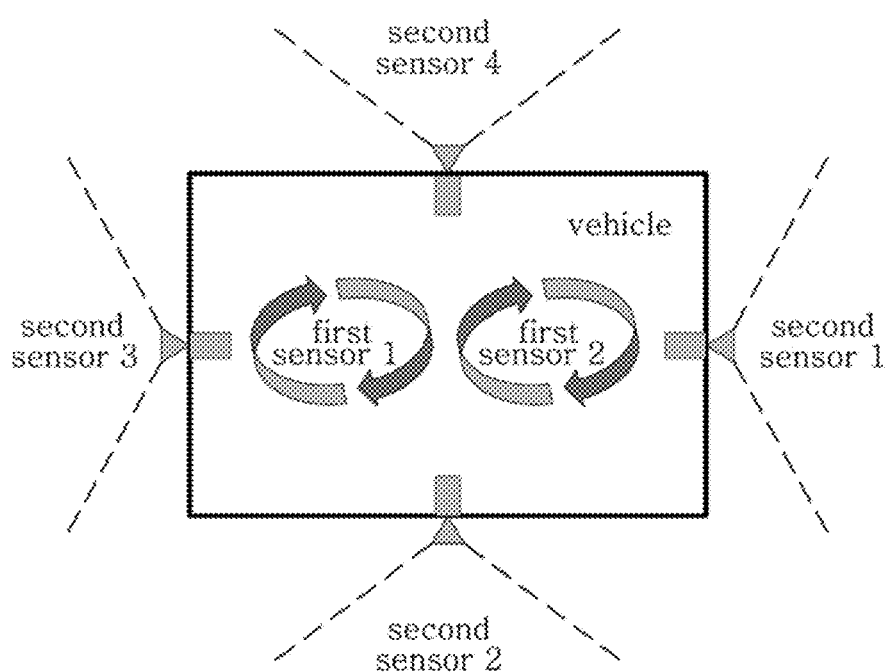
FIG. 2 is a schematic view exemplarily showing a first sensor and a second sensor, which provides signals to the data processing system for the fusion of multiple heterogeneous sensors according to an embodiment of the present disclosure.
Figure 3:
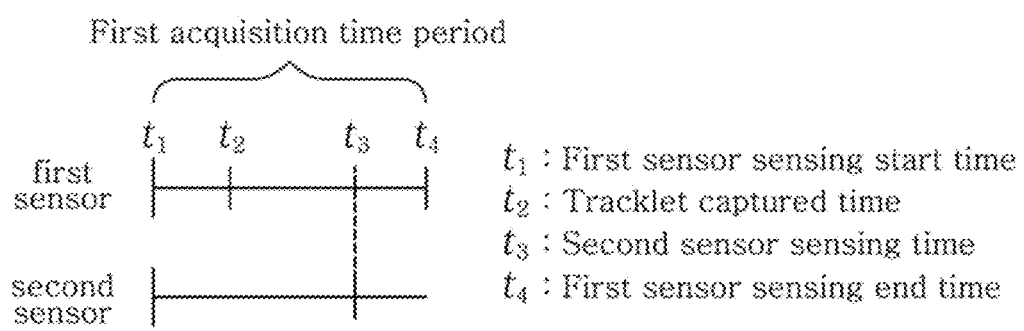
FIG. 3 is a graph showing a sensing time of the first sensor and the second sensor.
Figure 4:
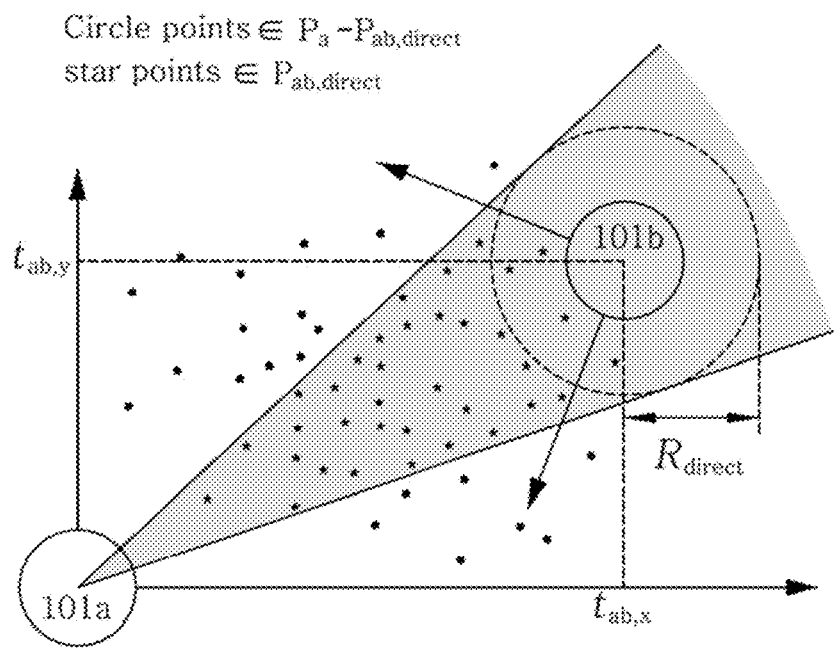
FIG. 4 is a diagram for illustrating direct interference generated between a plurality of first sensors.
Figure 5A:
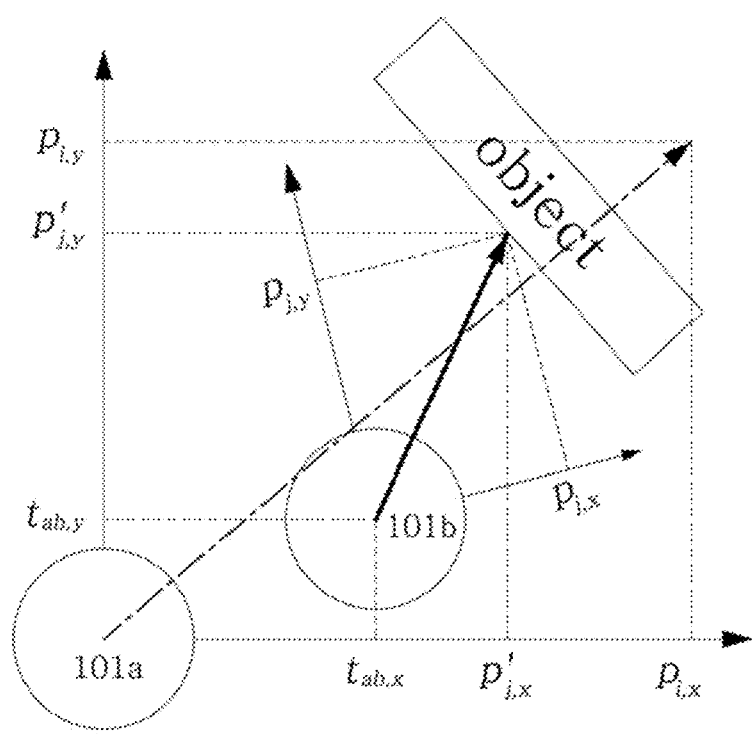
FIGS. 5A to 5C are diagrams for illustrating indirect interference generated between the plurality of first sensors.
Figure 5B:
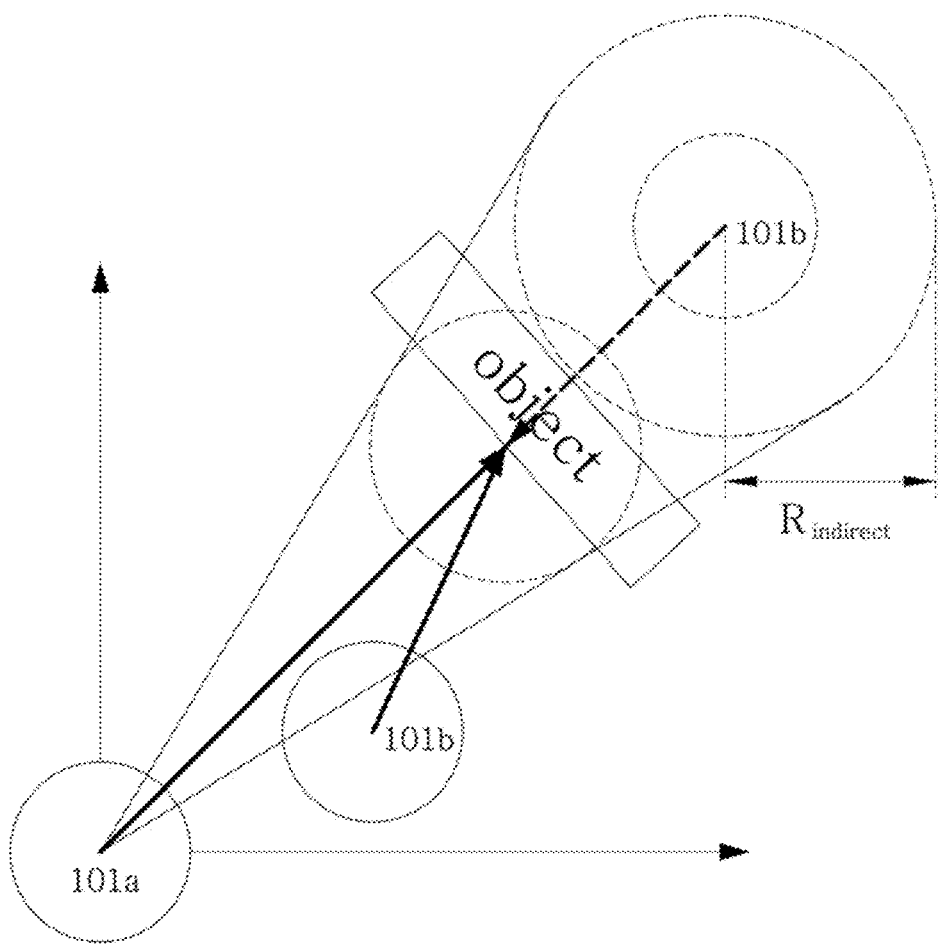
Figure 5C:
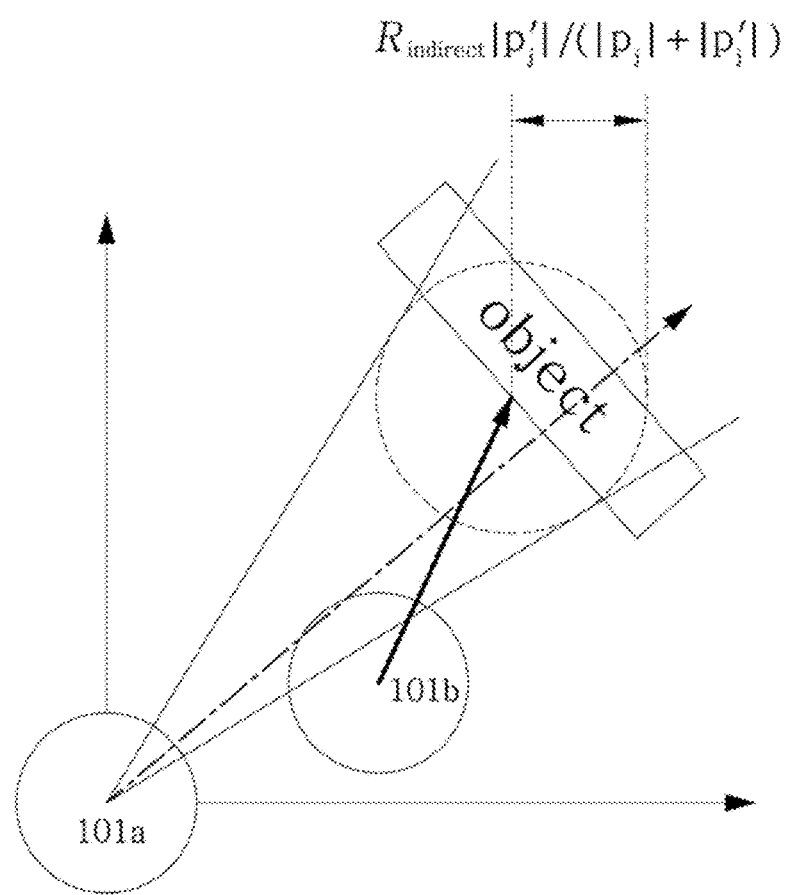
Figure 6:
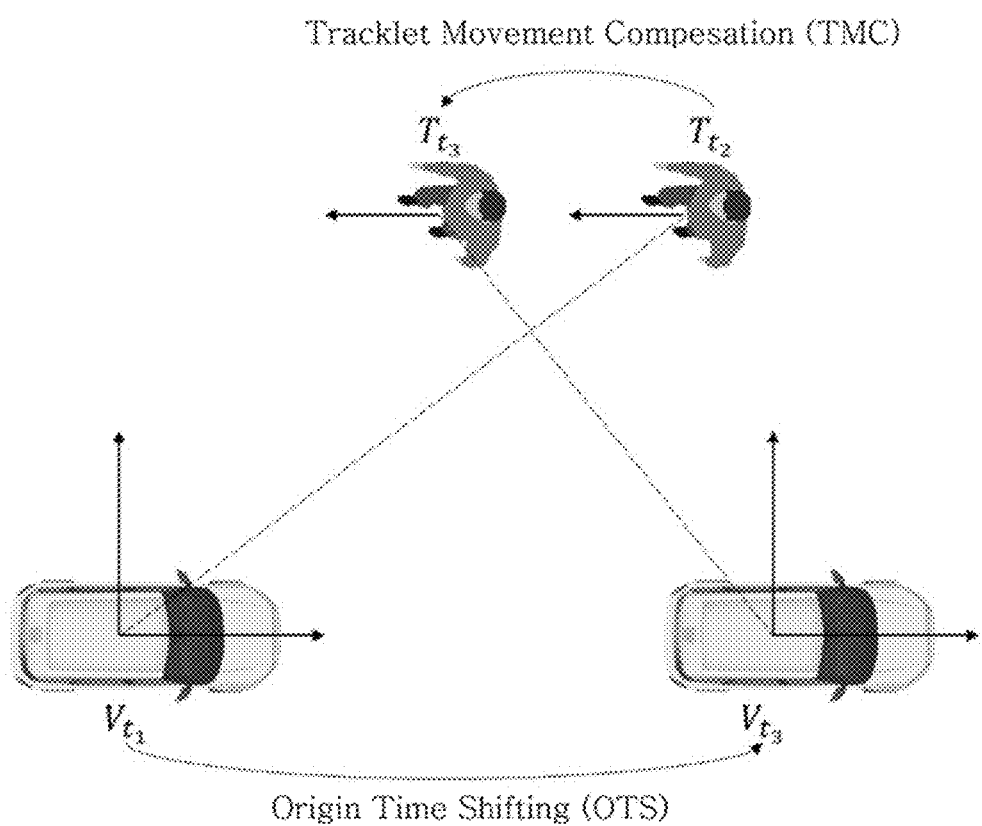
FIG. 6 is a diagram for illustrating the concept of origin time shifting (OTS) and tracklet movement compensation (TMC).
Figure 7:
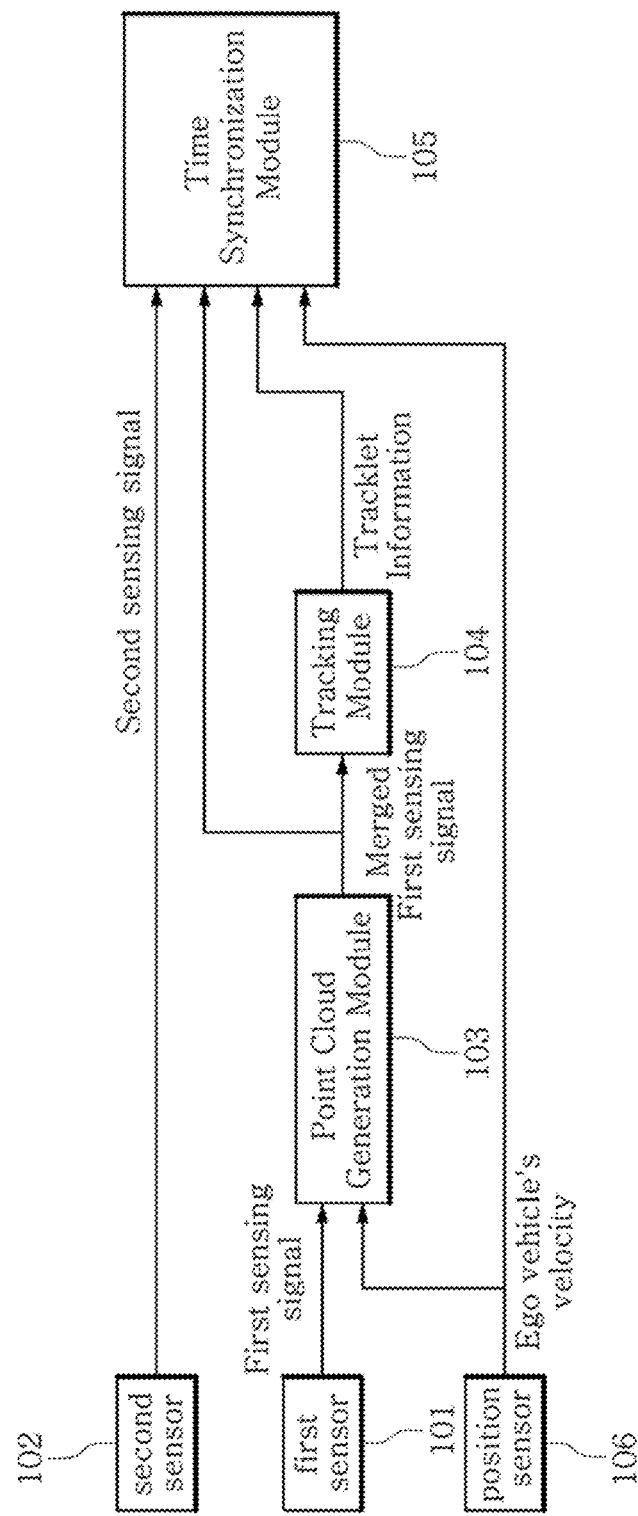
FIG. 7 is a block diagram showing the data processing system for the fusion of multiple heterogeneous sensors according to an embodiment of the present disclosure.
Figure 8:
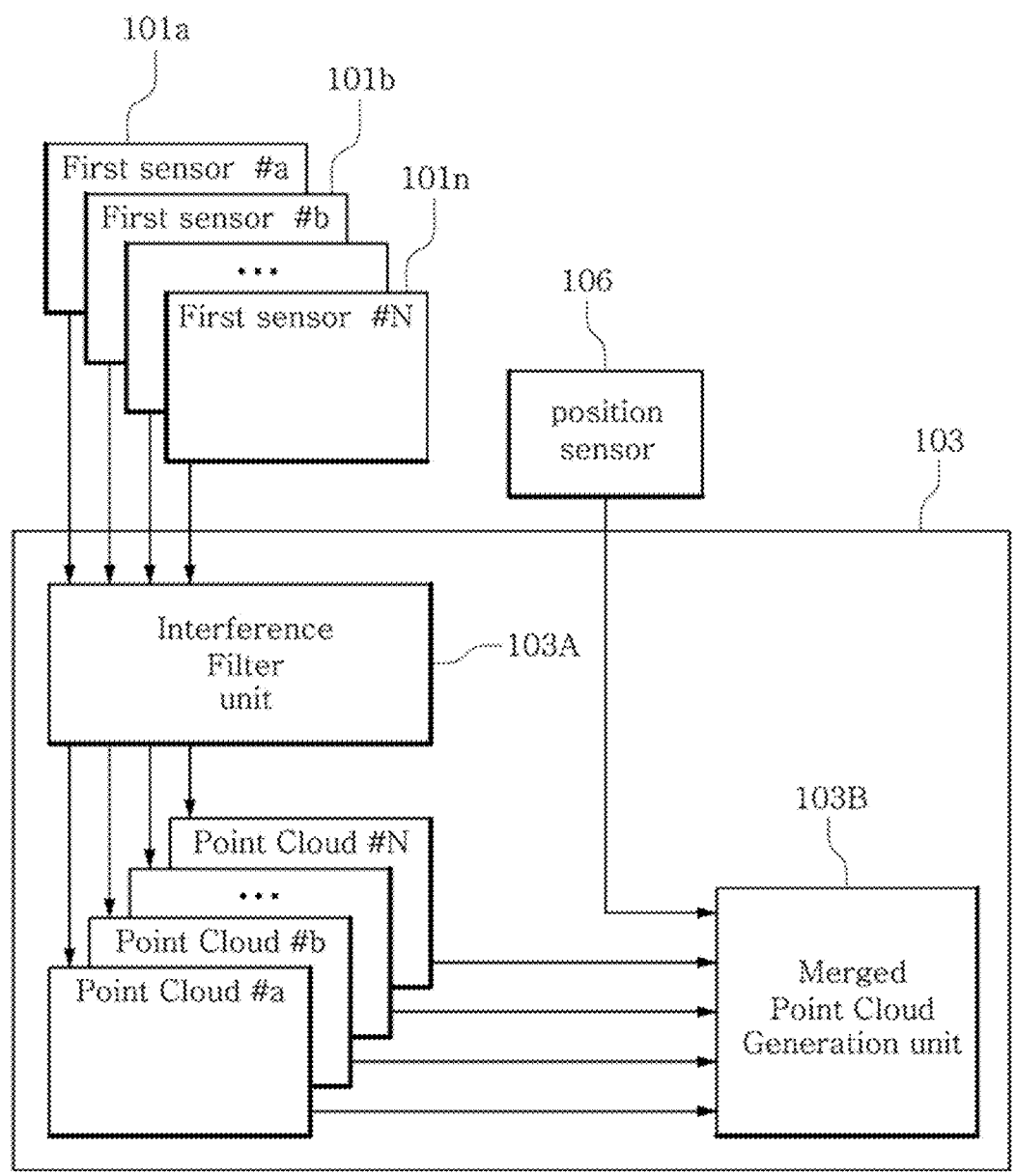
FIG. 8 is a block diagram showing a point cloud generation module of the system of FIG. 7.
Figure 9:
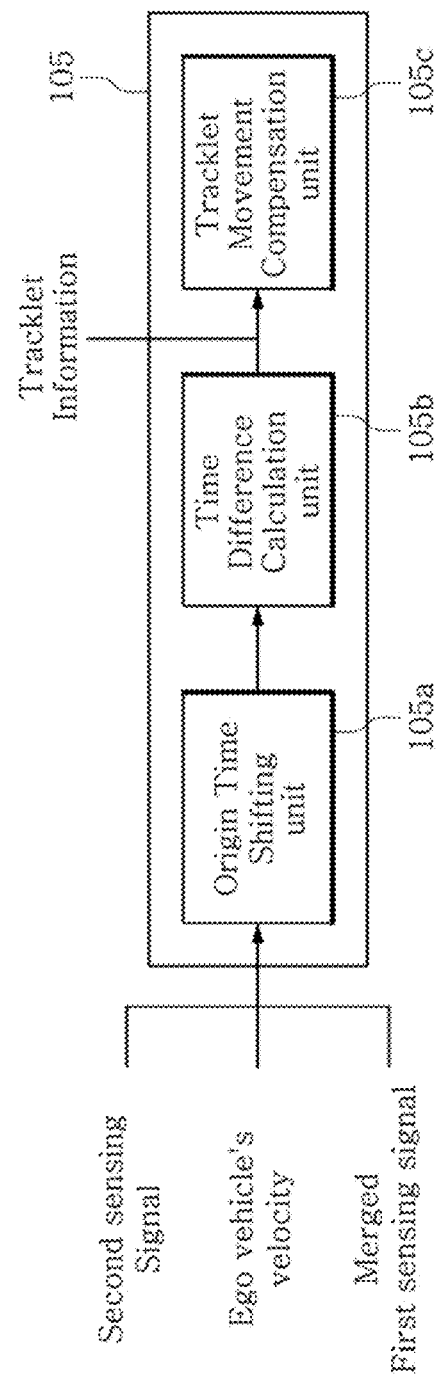
FIG. 9 is a block diagram showing a time synchronization module of the system of FIG. 7.
Figure 10:
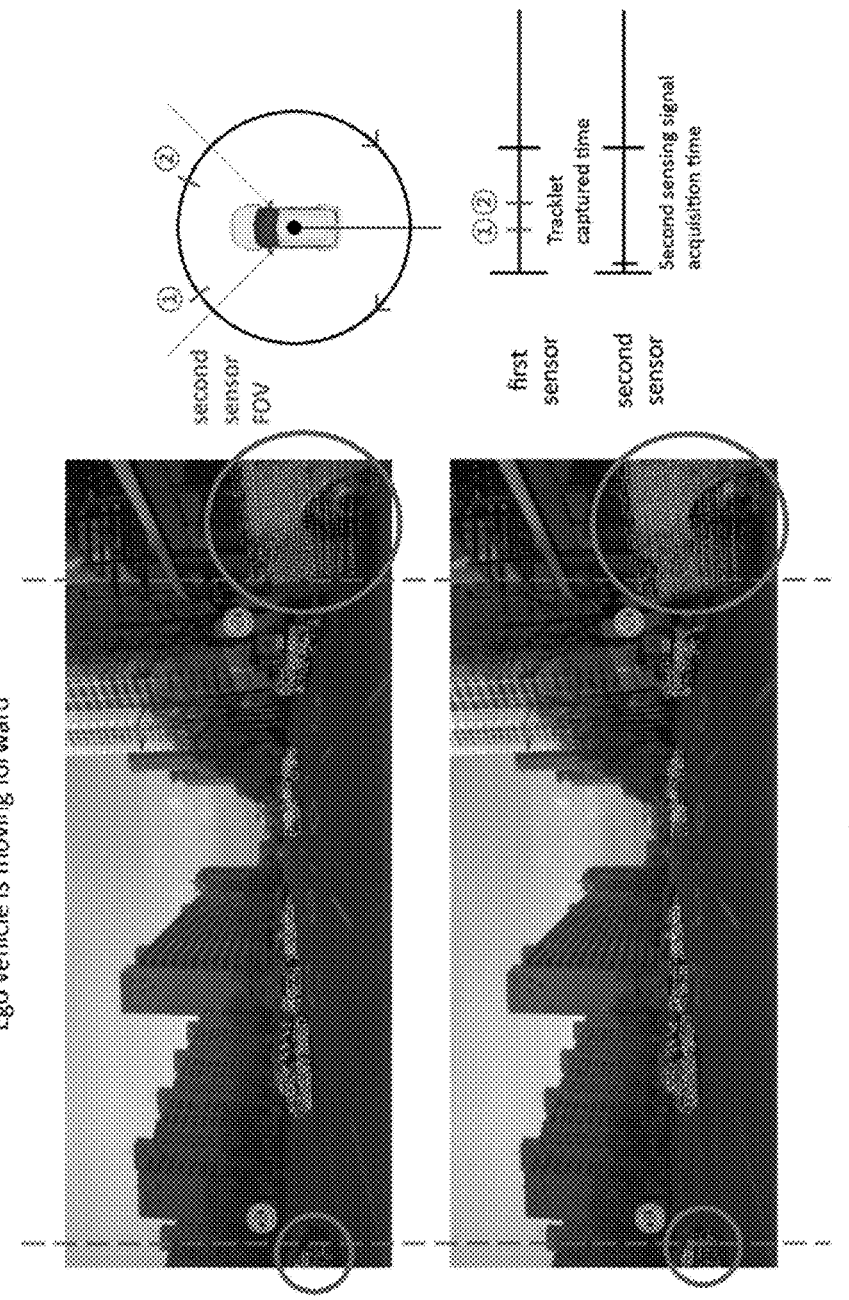
FIG. 10 is an exemplary picture showing a corrected point cloud by means of origin time shifting.
Figure 11:
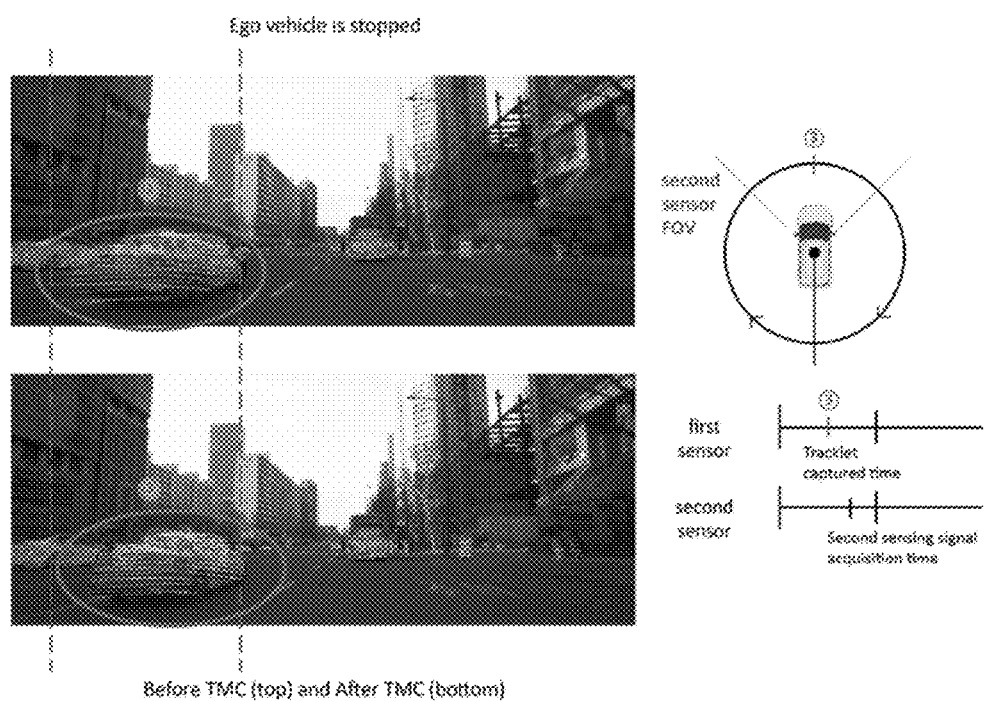
FIG. 11 is an exemplary picture showing a corrected point cloud by means of tracklet movement compensation.

FIG. 1 is a schematic view exemplarily showing an autonomous vehicle to which a data processing system for the fusion of multiple heterogeneous sensors according to an embodiment of the present disclosure is applied. FIG. 2 is a schematic view exemplarily showing a first sensor and a second sensor, which provides signals to the data processing system for the fusion of multiple heterogeneous sensors according to an embodiment of the present disclosure. FIG. 3 is a graph showing a sensing time of the first sensor and the second sensor. FIG. 4 is a diagram for illustrating direct interference generated between a plurality of first sensors. FIGS. 5A to 5C are diagrams for illustrating indirect interference generated between the plurality of first sensors. FIG. 6 is a diagram for illustrating the concept of origin time shifting (OTS) and tracklet movement compensation (TMC). FIG. 7 is a block diagram showing the data processing system for the fusion of multiple heterogeneous sensors according to an embodiment of the present disclosure. FIG. 8 is a block diagram showing a point cloud generation module of the system of FIG. 7. FIG. 9 is a block diagram showing a time synchronization module of the system of FIG. 7. FIG. 10 is an exemplary picture showing a corrected point cloud by means of origin time shifting. FIG. 11 is an exemplary picture showing a corrected point cloud by means of tracklet movement compensation.

Referring to FIGS. 1 to 11, a data processing system 10 for the fusion of multiple heterogeneous sensors according to an embodiment of the present disclosure includes a first sensor 101, a second sensor 102, a point cloud generation module 103, a tracking module 104, a time synchronization module 105, and a position sensor 106.

A data processing system 10 for the fusion of multiple heterogeneous sensors according to an embodiment of the present disclosure is a data processing system for surround sensing of an autonomous navigation system. The data processing system for the fusion of multiple heterogeneous sensors provides a data processing system that fuses signals provided from at least two different types of sensors (a first sensor and a second sensor) for surround sensing.

Specifically, the data processing system 10 for the fusion of multiple heterogeneous sensors according to this embodiment may fuse a first sensing signal provided from the first sensor 101 and a second sensing signal provided from the second sensor 102, which are different from the first sensor 101. Here, the fusion of signals may mean the synchronization of the time points of the data acquired from the sensors.

Here, the acquisition time point of the first sensing signal of the first sensor 101 may differ from the acquisition time point of the second sensing signal of the second sensor 102. Also, the method of acquiring the first sensing signal by the first sensor 101 may be different from the method of acquiring the second sensing signal by the second sensor 102. That is, the second sensor may be different from the first sensor in terms of the sensing signal generating manner and/or the sensing signal generating time point.

For example, the first sensor 101 may adopt a sensing method using an electromagnetic wave or a laser, and the second sensor 102 may adopt a sensing method using light. As shown in FIGS. 1 and 2, the first sensor 101 may be a LiDAR sensor, and the second sensor 102 may be a camera.

The LiDAR sensor acquires the first sensing signal for the environment around a vehicle during the first acquisition time period while rotating at a constant velocity. The camera has a field of view (FoV) of a fixed angle. The camera is fixed at a specific position of the vehicle and acquires the second sensing signal by photographing during a second acquisition time period, which is very short corresponding to a predetermined range and distance region. The acquisition time period of the first sensing signal of the first sensor 101 and the acquisition time period of the second sensing signal of the second sensor 102 may be different. For example, the first acquisition time period required for the first sensor 101 to acquire the first sensing signal may be relatively longer than the second acquisition time period required for the second sensor 102 to acquire the second sensing signal. The first sensor 101 may be located in plural at the autonomous vehicle, and the second sensor 102 may also be located in plural.

However, the present disclosure is not limited thereto, and the first sensor 101 and the second sensor 102 may adopt different types of LiDAR sensors. For example, the first sensor 101 may be a rotatable LiDAR sensor, and the second sensor 102 may be a flash LiDAR sensor, so that the first sensing signal of the first sensor 101 and the second sensing signal of the second sensor 102 have different acquisition time points. Also, the first sensor 101 and the second sensor 102 may adopt flash LiDAR sensors comprising different sensing time points. Accordingly the first sensing signal of the first sensor 101 and the second sensing signal of the second sensor 102 have different acquisition time points. Here, at least the first sensing signal may have a plurality of points including information about a three-dimensional spatial location of the surrounding environment of the vehicle, and in the first sensing signal, the positions of the plurality of points may be corrected based on the acquisition time point of the second sensing signal. The data processing system 10 can remove the interference generated between a plurality of first sensors 101 effectively. Also, the data processing system 10 for the fusion of multiple heterogeneous sensors according to this embodiment receives velocity information of the vehicle from the position sensor 106 and synchronizes the time of the first sensing signal and the time of the second sensing signal by using the velocity information of the vehicle. Here, the position sensor 106 may be an inertial measurement unit (IMU), without being limited thereto.

The data processing system 10 for the fusion of multiple heterogeneous sensors according to this embodiment may be entirely hardware, or partly hardware and partly software. For example, the data processing system for the fusion of multiple heterogeneous sensors and the modules included therein may collectively refer to devices for exchanging data of a specific type and contents in an electronic communication and related software. The terms "unit", "module", "server", "system", "device" or "terminal" used in this specification are intended to indicate a combination of hardware and software driven by the hardware. For example, the hardware may be a data processing device including a CPU or another processor. Further, the software driven by the hardware may refer to a running process, an object, an executable, a thread of execution, a program, and the like.

Also, the modules included in the data processing system 10 for the fusion of multiple heterogeneous sensors are not intended to refer to separate components that are physically distinct from each other. The point cloud generation module 103, the tracking module 104 and the time synchronization module 105 are shown as separate blocks, but this is just for functionally distinguishing components of the data processing system for the fusion of multiple heterogeneous sensors according to operations performed by the corresponding components. Accordingly, in some embodiments, the point cloud generation module 103, the tracking module 104 and the time synchronization module 105 may be partially or entirely integrated in one device, or at least one of them may be implemented as a separate component that is physically distinguished from other components. Also, under the distributed computing environment, these components may be communicatively coupled to each other.

The point cloud generation module 103 receives the first sensing signal from the first sensor 101. The point cloud generation module 103 may also receive the velocity information of the vehicle from the position sensor 106.

The first sensing signal is a signal obtained when the first sensor 101 senses the surrounding of the vehicle during the first acquisition time period. In order to sense the environment around the vehicle, the first sensor 101 emits the first signal around the vehicle and measures the time when the first signal returns after reflecting from the environment around the vehicle to generate the first sensing signal related to a spatial location of the reflection point. The first sensing signal may be a point comprising information on the plurality of points provided from a plurality of reflection points. The point corresponds to a point in a three-dimensional space around the vehicle. Here, the first acquisition time period means a preset predetermined time period. As shown in FIG. 3, the first sensor 101 generates the first sensing signal by sensing the surrounding of the vehicle during the first acquisition time period, which corresponds to a period from the first time point ($t_1$) to the fourth time point ($t_4$). The first sensor 101 may periodically generate the first sensing signal according to a predetermined period.

As shown in FIG. 8, the first sensor 101 may include a plurality of sensors. The plurality of first sensors 101*a*, 101*b*, . . . , 101*n* may be disposed at different positions of the vehicle. Each of the plurality of first sensors 101*a*, 101*b*, . . . , 101*n* generate the first sensing signal.

The point cloud generation module 103 may remove the influence generated between the plurality of first sensors 101*a*, 101*b*, . . . , 101*n* and adjust the position of the point information according to the acquisition time point of the first sensing signal. Specifically, the point cloud generation module 103 includes an interference filter unit 103A and an merged point cloud generation unit 103B.

The interference filter unit 103A may remove the influence generated between the plurality of first sensors 101*a*, 101*b*, . . . , 101*n*. The interference filter unit 103A may respectively receive the first sensing signals generated by the plurality of first sensors 101*a*, 101*b*, . . . , 101*n* and remove a noise point created by the signal interference included in each first sensing signal. Each first sensing signal, from which noise caused by signal interference is removed, is provided to the merged point cloud generation unit 103B.

Here, the interference includes direct interference that is generated as the signal emitted from one first sensor 101*a* is directly applied to the other first sensors 101*b*, . . . , 101*n*, and indirect interference that is generated as the signal emitted from one first sensor 101*a* is reflected on an external object and then applied to the other first sensors 101*b*, . . . , 101*n*. The interference filter unit 103A may remove noise points caused by the direct interference and the indirect interference from each received first sensing signal.

The interference filter unit 103A may define a region where direct interference may occur between the plurality of first sensors 101 and filter direct interference in consideration of the acquisition time period of the point cloud included in the region.

For example, as shown in FIG. 4, when there are two first sensors 101a, 101b, the specific region between the first sensor 101a and the first sensor 101b may be defined as a region where direct interference may occur. Circle points of FIG. 4 are the region where direct interference does not occur, and star points of FIG. 4 are the region where direct interference may occur. The point cloud group included in the region where the direct interference may occur is defined as follows. Assuming that the relative translation of the first sensor 101b in the local coordinate system of the first sensor 101a is $t_{ab}$, the point cloud sub group ($P_{ab,direct}$) belonging to the direct interference probable region of the first sensor 101b with respect to the group ($P_a$) of the first sensing signal (point cloud) acquired by the first sensor 101a is defined as in Equation 1 below.

$$P_{ab,direct} = \{p_k \mid p'_{k',x} > 0 \text{ and } p'^2_{k,y} + p'^2_{k,z} < K_{ab,direct} p'^2_{k,x}\} \quad \text{[Equation 1]}$$

(Here, $$p'_k = \begin{bmatrix} p'_{k,x} \\ p'_{k,y} \\ p'_{k,z} \end{bmatrix} =$$

$$T_{ab} p_k = \begin{bmatrix} \cos\psi_{ab}\cos\theta_{ab} & \sin\psi_{ab}\cos\theta_{ab} & -\sin\theta_{ab} \\ -\sin\psi_{ab} & \cos\psi_{ab} & 0 \\ \cos\psi_{ab} & \sin\psi_{ab} & \sin\theta_{ab} \end{bmatrix} \begin{bmatrix} p_{k,x} \\ p_{k,y} \\ p_{k,z} \end{bmatrix} \text{ for } \forall p_k \in P_a,$$

-continued $$\psi_{ab} = -\operatorname{atan}\left(t_{ab,z} \Big/ (t^2_{ab,x} + t^2_{ab,y})^{\frac{1}{2}}\right),$$

$$\theta_{ab} = \operatorname{atan}(t_{ab,y}/t_{ab,x}),$$

$$t_{ab} = [t_{ab,x} \ t_{ab,y} \ t_{ab,z}]^T,$$

$$K_{ab,direct} = R^2_{direct} / (t^2_{ab,x} + t^2_{ab,y} + t^2_{ab,z}),$$

$R_{direct}$ is a parameter on a radius of the direct interference region centered by the first sensor.)

In addition, the point cloud sub group ($P_{ba,direct}$) belonging to the direct interference probable region of the first sensor 101a with respect to the group ($P_b$) of the point cloud acquired by the first sensor 101b may also be defined in the same way as Equation 1.

Here, the timestamp of the mean data acquisition time for the group (P) of the first sensing signal (point cloud) is defined as $\mathcal{T}$ (P). If $P_{ab,direct}$ and $P_{ba,direct}$ of the mutual direct interference probable region calculated by the first sensor 101a and the first sensor 101b satisfy Equation 2 below, the interference filter unit 103A determines the point cloud sub groups of the corresponding region as noise points caused by direct interference and removes the point cloud sub groups.

Accordingly, the point cloud sub group caused by direct interference may be removed.

$$|\mathcal{T}(P_{ab,direct}) - \mathcal{T}(P_{ba,direct})| < \tau_{direct} \quad \text{[Equation 2]}$$

Here, $\tau_{direct}$ is a parameter on the difference of the acquisition time periods.

As described above, the region where direct interference may occur may be defined according to the positions where the plurality of first sensors 101a, 101b, . . . , 101n are disposed. However, since the indirect interference is a noise signal incident after being reflected by the surrounding objects, it is difficult to preset an indirect interference probable region. Thus, the interference filter unit 103A according to this embodiment may set a time interval in which indirect interference may occur in consideration of the operation characteristics of the first sensor 101, for example rotation velocity or sensing time, and then remove the points included in the region where indirect interference may occur from the groups satisfying the time interval by regarding the points as noise. That is, the indirect interference may be filtered by considering the position of the point cloud included in the preset time.

When there are two first sensors 101a, 101b, the group of the first sensing signal (point cloud) acquired from the first sensor 101a and the first sensor 101b are defined as $P_a$ and $P_b$, respectively. The interference filter unit 103A may record subgroups of each point based on the acquisition time period of the point cloud as shown in Table 1 below.

TABLE 1

| | timestamp $\mathcal{T}$ (P) | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| subset of $P_a$ | $P_{a,0}$ | | | | $P_{a,1}$ | | | | $P_{a,2}$ | | | | $P_{a,3}$ | | | | |
| subset of $P_b$ | | $P_{b,0}$ | $P_{b,1}$ | | $P_{b,2}$ | $P_{b,3}$ | | $P_{b,4}$ | | | | $P_{b,5}$ | | | | | $P_{b,6}$ |

Here, the point cloud sub group satisfying the time when indirect interference may occur at $P_a$ and $P_b$ are respectively defined as $P_i$ and $P_j$, and the sub groups $P_i$, $P_j$ satisfy Equation 3 below. In addition, $N_{ab}$ that is a group of ($P_i$, $P_j$) where the sub groups $P_i$, $P_j$ are associated is defined as in Equation 4 below.

$$|\tau(P_i) - \mathcal{T}(P_j)| < \tau_{indirect}, P_i \subset P_a, P_j \in P_b$$

(Here, $\tau_{indirect}$ is a parameter on the time difference where indirect interference may occur.)

$$N_{ab} = \{(P_i, P_j) \mid |\mathcal{T}(P_i) - \mathcal{T}(P_j)| < \tau_{indirect}, P_i \in P_a, P_j \in P_b\} \quad \text{[Equation 4]}$$

For example, in the data of Table 1, in case of $\tau_{indirect} = 1.5$, $N_{ab}$ is defined as in Equation 5 below.

$$N_{ab} = \{(P_{a,0}, P_{b,0}), (P_{a,1}, P_{b,2}), (P_{a,2}, P_{b,3}), (P_{a,2}, P_{b,4}), (P_{a,2}, P_{b,5}), \ldots\}$$

When there are two first sensors 101a, 101b, indirect interference may occur in the defined time interval as shown in FIGS. 5A to 5C.

FIG. 5A shows an exemplary situation in which when the first sensor 101a is scanning an object, the first sensor 101b is simultaneously scanning in a similar direction, where indirect interference may occur. That is, as shown in FIG. 5A, the signal emitted from the first sensor 101b may be reflected to an external object and then be incident on the first sensor 101a to become a noise component.

As shown in FIG. 5B, the signal emitted from the first sensor 101b and reflected on an object to enter the first sensor 101a may be expressed in a form similar to the direct interference generated between the first sensor 101a and the first sensor 101b located at the opposite side of the object. Also, an indirect interference radius (R_indirect) corresponding to a region where indirect interference may occur in the point cloud acquired by the first sensor 101a may be defined similar to a direct interference radius. FIG. 5C geometrically shows the indirect interference radius (R_indirect) corresponding to the region where indirect interference may occur in the point cloud acquired by the first sensor 101a. The indirect interference radius may be calculated by the following procedure.

When the relative translation of the first sensor 101b is $t_{ab} \in \mathbb{R}^3$ and the relative rotation matrix is $R_{ab} \in \mathbb{R}^{3 \times 3}$ at the local coordinate of the first sensor 101a, the point cloud group ($P_{a \leftarrow b}$) obtained by mapping the point cloud group ($P_b$) at the local coordinate of the first sensor 101b with the local coordinate of the first sensor 101a by means of 6-DoF homogeneous transformation is defined as in Equation 6 below.

$$P_{a \leftarrow b} = \{p'_k | p'_k = R_{ab} p_k + t_{ab}, p_k \in P_b\} \quad \text{[Equation 6]}$$

At ($P_i$, $P_j$) of the group $N_{ab}$ defined in Equation 4 above, the point cloud sub group obtained by transforming $P_j \in P_b$ to the local coordinate of the first sensor 101a may be defined as $P'_j \in P_{a \leftarrow b}$. When there are any two points $p_i \in P_i$, $p_j \in P_j$, the point cloud sub group ($P_{ij,indirect}$) belonging to the indirect interference region by the first sensor 101b is defined as in Equation 7 below.

$$P_{ij,indirect} = \{p_i \mid p'_{i,x} > 0 \text{ and } p'^2_{i,y} + p'^2_{i,z} < K_{ij,indirect} p'^2_{i,x}\} \quad \text{[Equation 7]}$$

(Here, $$p'_i = \begin{bmatrix} p'_{i,x} \\ p'_{i,y} \\ p'_{i,z} \end{bmatrix} = T'_j p_k = \begin{bmatrix} \cos\psi'_j \cos\theta'_j & \sin\psi'_j \cos\theta'_j & -\sin\theta'_j \\ -\sin\psi'_j & \cos\psi'_j & 0 \\ \cos\psi'_j & \sin\psi'_j & \sin\theta'_j \end{bmatrix} \begin{bmatrix} p_{i,x} \\ p_{i,y} \\ p_{i,z} \end{bmatrix} \text{ for } \forall p_i \in P_i$$

$$\psi'_j = -\mathrm{atan}\left(p'_{j,z} / (p'^2_{j,x} + p'^2_{j,y})^{\frac{1}{2}}\right),$$

$$\theta'_j = \mathrm{atan}(p'_{j,y} / p'_{j,x}),$$

$$K_{ij,indirect} = (R_{indirect} |p'_j| / (|p_j| + |p'_j|))^2 / (p'^2_{j,x} + p'^2_{j,y} + p'^2_{j,z}),$$

$$p'_j = [p'_{j,x} \; p'_{j,y} \; p'_{j,z}]^T = R_{ab} p_j + t_{ab}.)$$

$R_{indirect}$ is a parameter value for determining a maximum radius of the indirect interference region centered by the reflection point.

At ($P_i$, $P_j$) of the group $N_{ab}$ defined in Equation 4 above, the interference filter unit 103A removes the point cloud sub group that is determined as being present in the indirect interference region according to Equation 7. Accordingly, the point cloud sub group generated by indirect interference may be removed.

The interference filter unit 103A provides the first sensing signal, from which noise caused by signal interference is removed, to the merged point cloud generation unit 103B.

The vehicle to which the system 10 of the present disclosure is applied is running, but the first sensor 101 performs sensing without consideration of this movement. That is, while the first sensor 101 is generating the first sensing signal during the first acquisition time period, the vehicle may be continuously running. Thus, the positions of the plurality of points of the first sensing signal should be adjusted to compensate for the movement of the vehicle. Namely, the plurality of points need to be adjusted to a specific reference time point.

The merged point cloud generation unit 103B changes the positions of the plurality of points twisted according to the movement of the vehicle to a position corresponding to the specific reference time. That is, the merged point cloud generation unit 103B performs un-twisting to change the position in the three-dimensional space of each point information to the position corresponding to the reference time. Here, the un-twisting means that the position in the three-dimensional space of the plurality of points of the first sensing signal is corrected to the position corresponding to the reference time.

The reference time may be a first time point ($t_1$) at which the first sensor 101 starts sensing, but without being limited thereto, and the reference time may also be a fourth time point ($t_4$) at which the sensing is completed. That is, the reference time corresponds to a specific time point of the first acquisition time period corresponding to a predetermined time interval and is not specified to the first time point ($t_1$) or the fourth time point ($t_4$). In the following, the reference time of the first merged sensing signal is specified as the first time point ($t_1$) for the sake of explanation.

The merged point cloud generation unit 103B infers the position information corresponding to the reference time of the plurality of twisted points based on the velocity information and the position information of the vehicle provided from the position sensor 106, and adjusts the positions of the plurality of points to positions corresponding to the reference time.

The merged point cloud generation unit 103B receives the first sensing signal from each of the plurality of first sensors 101 and performs a position correction (un-twisting) on each of the plurality of received first sensing signals to generate a corrected first sensing signal.

The merged point cloud generation unit 103B may merge the plurality of corrected first sensing signals to generate a first merged sensing signal. The generated first merged sensing signal may be a combination of all point information included in the plurality of first sensing signals and corresponds to a signal comprising the same reference time point. The generated first merged sensing signal is provided to the tracking module 104 and the time synchronization module 105, respectively.

The tracking module 104 generates tracklet information obtained by tracking the movement of objects around the vehicle. Specifically, the tracking module 104 analyzes the first merged sensing signal and compares the analysis result of the current first merged sensing signal with the analysis result of the first merged sensing signal of the previous period to generate tracklet information including the velocity information of each point. The tracking module 104 may further include a memory, and the analysis result of the current first merged sensing signal may be stored in the memory and used to calculate the tracklet information of the next cycle. In the tracking module 104, the first merged sensing signal may be analyzed by, for example, descriptor or object detection methods, without being limited thereto.

The tracking module 104 may calculate a descriptor indicating the relationship with surrounding points for each point. That is, the descriptor may correspond to the analysis result of the first merged sensing signal described above. The tracking module 104 may compare the descriptor of the current first merged sensing signal with the descriptor of the previous first merged sensing signal to find a corresponding point and then generate the tracklet information of each point for estimating the velocity by grasping the movement information. Here, each of the plurality of points may be utilized as one object, or the plurality of points may be made into a lattice to be as one object.

In addition, the tracking module 104 may track movement based on a detected object. That is, the tracking module 104 may firstly perform object detection, which is an operation for identifying an object to be traced from the points included in the first merged sensing signal. The object detection may include a classification process for classifying objects to be tracked such as other vehicles, pedestrians included in the first merged sensing signal, and/or a segmentation process for segmenting the objects based on distance. The tracking module 104 may compare the object detected by analyzing the current first merged sensing signal with the detected object analyzed by the previous first merged sensing signal to track the movement of the objects. The tracking module 104 may generate tracklet information including three-dimensional spatial position and velocity information of the objects by means of the above tracking. The generated tracklet information may be provided to the time synchronization module 105.

The time synchronization module 105 receives the first merged sensing signal from the point cloud generation module 103, receives the second sensing signal from the second sensor 102, receives the tracklet information from the tracking module 104, and receives the velocity information of the vehicle (the vehicle's velocity) from the position sensor 106.

The second sensor 102 may acquire the second sensing signal at a time point different from the first sensing signal, and as shown in FIG. 3, may acquire the second sensing signal at the third time point ($t_3$). The second sensor 102 may be provided in plural. Here, the second sensing signal may be an image signal for the surrounding environment. The third time point ($t_3$) at which the second sensor 102 acquires the second sensing signal and the first time point ($t_1$) corresponding to the reference time at the first merged sensing signal may be different time points. Here, the third time point ($t_3$) at which the second sensor 102 acquires the second sensing signal may be a specific time point included in the first acquisition time period ($t_1$ to $t_4$) at which the first sensor 101 acquires the first sensing signal, without being limited thereto. However, in some embodiments, the third time point ($t_3$) may be a time point earlier than the first time point ($t_1$) corresponding to the reference time or a time point later than the first time point ($t_1$).

Thus, when the first merged sensing signal (point cloud) is displayed on the second sensing signal (image) comprising a different acquisition time point, the first merged sensing signal and the second sensing signal may not be exactly matched due to the different acquisition time points. Also, when the first sensor 101 generates the first sensing signal during the first acquisition time period ($t_1$ to $t_4$), the time point at which the moving object is detected may be the second time point ($t_2$).

If the vehicle coordination system for a specific time t is defined as $v_t$ and the tracklet coordinate system at time of the moving object (tracklet) detected at a specific time t is defined as $T_t$, in the vehicle coordination system, the position of the tracklet is defined as $pv_t(T_t)$.

In the first merged sensing signal generated by the point cloud generation module 103, the reference time of each point may be the first time point ($t_1$), and the position of the tracklet may be defined as $pv_{t_1}(T_{t_2})$. The first merged sensing signal is data in a state of being not synchronized with the second sensing signal acquired at the third time point ($t_3$). Here, the third time point ($t_3$) may be an acquisition time point of the second sensing signal closest to the first time point ($t_1$). The time synchronization module 105 performs origin time shifting (OTS) and tracklet movement compensation (TMC) to synchronize the first merged sensing signal and the second sensing image.

Here, the OTS may be defined as in Equation 8 below.

$$pv_{t_3}(T_{t_2})=OTS(pv_{t_1}(T_{t_2}))  \quad \text{[Equation 8]}$$

Namely, the OTS is a correction of the velocity of the ego vehicle and means that the first merged sensing signal of the first time point ($t_1$) is moved to the third time point ($t_3$) by reflecting the movement of the ego vehicle. Each point of the first merged sensing signal may be moved from $pv_{t_1}(T_{t_2})$ to $pv_{t_3}(T_{t_2})$, which is a position corresponding to the third time point ($t_3$) that is the acquisition time point of the second sensing signal.

In addition, the TMC may be defined as in Equation 9 below.

$$pv_{t_3}(T_{t_3})=TMC(pv_{t_3}(T_{t_2}))  \quad \text{[Equation 9]}$$

The TMC is a correction of the movement of the moving object and corresponds to correction that moves the position of the tracklet by reflecting the movement of the tracklet. As described above, the tracklet is acquired at the second time point ($t_2$), and the current reference time corresponds to the third time point ($t_3$). Thus, it is required to make correction in consideration of the change of position caused by continuous movement of the tracklet. Namely, the TMC makes correction for the movement of the tracklet as much as a time difference of $t_3-t_2$. The position of the tracklet to which vehicle velocity is corrected by means of the OTS is corrected from $pv_{t_3}(T_{t_2})$ to $pv_{t_3}(T_{t_3})$ by means of the TMC.

As shown in FIG. 9, the time synchronization module 105 includes an OTS unit 105A, a time difference calculation unit 105B, and a TMC unit 105C.

The OTS unit 105A performs the OTS as described above. The OTS unit 105A may move the first merged sensing signal of the first time point ($t_1$) to the third time point ($t_3$) by reflecting the movement of the ego vehicle. The movement of the ego vehicle may be acquired based on the information on the velocity of the vehicle and the position of the vehicle, provided from the position sensor 106. Each point of the first merged sensing signal may be moved from $pv_{t_1}(T_{t_2})$ to $pv_{t_3}(T_{t_2})$, which is a position corresponding to the third time point ($t_3$) that is the acquisition time point of the second sensing signal. The OTS is effective in the case of correcting data of a stopped tracklet while the ego vehicle is moving. FIG. 10 displays the data obtained by applying the OTS to the acquired first merged sensing signal together with the second sensing signal in a state where the vehicle moves forward. The tracklet ① and the tracklet ② represent a stopped vehicle. In this situation, the second sensing signal is acquired while the first sensing signal is being acquired, and then the tracklet ① and the tracklet ② are acquired in order by the first sensor. Before the OTS is applied, since the tracklet ① and the tracklet ② are acquired later than the second sensing signal (image) and the vehicle moves forward as much as the time difference, the point cloud is displayed as being positioned closer to the image. If each point of the first merged sensing signal is corrected to a position corresponding to the acquisition time point of the second sensing signal by means of the OTS, the stopped tracklet ① and the stopped tracklet ② are exactly matched with the image.

The time difference calculation unit 105B may calculate the difference between the time at which each point of the first merged sensing signal is acquired and the time at which the second sensing signal is acquired. If the first sensor 101 acquires information around the ego vehicle while rotating, the acquisition time period of the sensed point may be changed due to the rotation of the first sensor 101. The plurality of points included in the first sensing signal have different acquisition time points within the first acquisition time period. For example, the tracklet ① and the tracklet ② of FIG. 10 are acquired at different times. The Merged point cloud generation unit 103B may record the acquisition time period of each point of the first merged sensing signal, and the acquisition time period of each point may be included in the first merged sensing signal and provided to the time difference calculation unit 105B. The time difference calculation unit 105B may calculate the difference ($t_3-t_2$) between the time at which each point included in the first merged sensing signal is acquired and the time at which the second sensing signal is acquired. The time difference ($t_3-t_2$) calculated by the time difference calculation unit 105B is provided to the TMC unit 105C.

In some embodiments, the first sensor 101 may be a flash-type LiDAR sensor that acquires information around the ego vehicle at the same time without rotating. In this case, the points of the first merged sensing signal may have substantially the same acquisition time period. Thus, if the points of the first merged sensing signal are acquired at the same time, the process of calculating the time difference between the times of acquiring the second sensing signal for the points may be omitted.

TMC unit 105C performs the TMC described above. TMC unit 105C receives the difference ($t_3-t_2$) between the time at which each point of the first merged sensing signal is acquired and the time at which the second sensing signal is acquired from the time difference calculation unit 105B, and receives the tracklet information including a three-dimensional spatial position and a velocity information of the object from the tracking module 104. TMC unit 105C performs correction to move the position of the tracklet by reflecting the movement of the tracklet and the time difference. Namely, among the points of the first merged sensing signal, the position of the point corresponding to a moving object may be adjusted again in consideration of the velocity and the time difference. The TMC is effective to the case of correcting data of a moving tracklet, which is acquired in a state where the ego vehicle stops. The ego vehicle of FIG. 11 is in a stopped state, and the tracklet ③ is an example where the TMC is applied to a forwardly moving situation. The tracklet ③ is acquired by the first sensor (LiDAR), and then the second sensing signal (image) is acquired. Before the TMC is applied, the tracklet ③ acquired by the first sensor is acquired earlier than the second sensing signal, and the tracklet moves forward as much as the time difference. For this reason, as shown before the TMC of FIG. 11 is applied, the point cloud is displayed as being at the rear of the image. As shown after the TMC of FIG. 11 is applied, the moving tracklet ③ corrected by the TMC is exactly matched with the image.

The time synchronization module 105 performs the OTS and the TMC to synchronize the first merged sensing signal with the second sensing signal and performs data processing for the fusion of heterogeneous sensors as described above. Also, the point cloud generation module 103 may remove noise points caused by direct interference and indirect interference from each received first sensing signal, thereby generating more accurate sensing data.

Hereinafter, a data processing method for the fusion of multiple heterogeneous sensors according to another embodiment of the present disclosure will be described.

Figure 12:
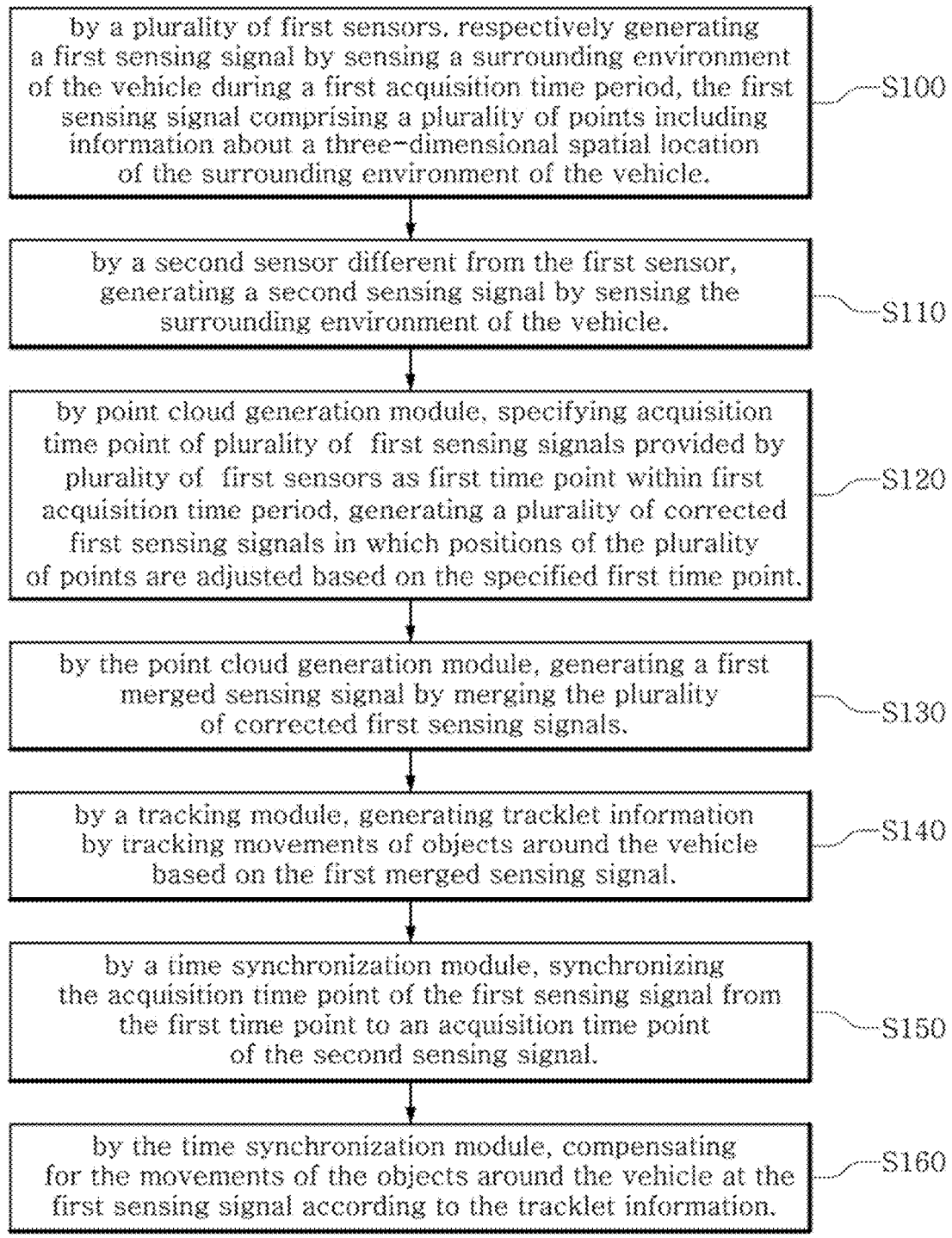
FIG. 12 is a flowchart for illustrating a data processing method for the fusion of multiple heterogeneous sensors according to embodiment of the present disclosure.

FIG. 12 is a flowchart for illustrating a data processing method for the fusion of multiple heterogeneous sensors according to embodiment of the present disclosure. The data processing method of FIG. 12 is performed at the data processing system 10 of FIGS. 1 to 11 as described above. The data processing system 10 for the fusion of multiple heterogeneous sensors includes a first sensor 101, a second sensor 102, a point cloud generation module 103, a tracking module 104, a time synchronization module 105, and a position sensor 106. For explanation and understanding of this embodiment, the above description of the data processing system 10 of FIGS. 1 to 11 may be referred to.

First, a plurality of first sensors 101 respectively generate a first sensing signal by detecting a surrounding environment of the vehicle during a first acquisition time period (S100).

The first sensing signal includes a plurality of points containing information about the three-dimensional spatial location of the surrounding environment of the vehicle. The first sensor 101 emits the first signal around the vehicle to sense the environment around the vehicle and measures the time of the first signal reflected by the environment around the vehicle and returning therefrom to generate a first sensing signal related to the spatial location of the reflection point. Here, the first acquisition time period means a preset predetermined time period. As shown in FIG. 3, the first sensor 101 generates the first sensing signal by sensing the surrounding of the vehicle during a first acquisition time period corresponding to the period from the first time point ($t_1$) to the fourth time point ($t_4$).

Next, the second sensor 102 senses the surrounding environment of the vehicle during the second acquisition time period to generate the second sensing signal (S110).

Here, the first sensor 101 and the second sensor 102 may differ from each other in terms of the acquisition time point of the first sensing signal and the acquisition time point of the second sensing signal. Also, the first sensor 101 and the second sensor 102 may differ from each other in terms of the method of acquiring the first sensing signal and the method of acquiring the second sensing signal. That is, the second sensor may be different from the first sensor in terms of the sensing signal generating manner and/or the sensing signal generating time point. For example, the first sensor 101 may adopt a sensing method using an electromagnetic wave or a laser, and the second sensor 102 may adopt a sensing method using light. The second sensor 102 may acquire the second sensing signal at the third time point ($t_3$). The second sensing signal may be an image signal for the surrounding environment.

The point cloud generation module 103 specifies the acquisition time points of the plurality of first sensing signals provided by the plurality of first sensors as the first time point within the first acquisition time period, and generates a plurality of corrected first sensing signals for adjusting the positions of the plurality of points based on the specified first time point (S120).

That is, while the first sensor 101 is generating the first sensing signal during the first acquisition time period, the vehicle may be in a moving state. Thus, the positions of the plurality of points of the first sensing signal should be adjusted to compensate for the movement of the vehicle. Namely, the plurality of points need to be adjusted to a specific reference time point.

The point cloud generation module 103 changes the positions of a plurality of points that are twisted according to the movement of the vehicle to a position corresponding to a specific reference time. The reference time may be the first time point ($t_1$) at which the first sensor 101 starts sensing, or may also be the fourth time point ($t_4$) at which the sensing is completed.

Here, the step of generating a plurality of corrected first sensing signals in which positions of the plurality of points are adjusted based on the specified first time point (S120) includes generating the plurality of corrected first sensing signals based on the velocity information and the position information of the vehicle provided by the position sensor. The point cloud generation module 103 infers the position information corresponding to the reference time of the plurality of twisted points based on the velocity information and the position information of the vehicle provided from the position sensor 106, and adjusts the positions of the plurality of points to positions corresponding to the reference time. The point cloud generation module 103 receives the first sensing signal from each of the plurality of first sensors 101 and performs a position correction (un-twisting) on each of the plurality of received first sensing signals to generate a corrected first sensing signal.

Next, the point cloud generation module merge the plurality of corrected first sensing signals to generate a first merged sensing signal (S130).

The point cloud generation module 103 may merge the plurality of corrected first sensing signals to generate a first merged sensing signal. The generated first merged sensing signal may be a combination of all point information included in the plurality of first sensing signals and corresponds to a signal comprising the same reference time point.

The tracking module 104 generates tracklet information obtained by tracking the movement of objects around the vehicle based on the first merged sensing signal (S140).

The tracking module 104 generates tracklet information by tracking the movement of objects around the vehicle. The tracking module 104 analyzes the first merged sensing signal and compares the analysis of the current first merged sensing signal with the analysis result of the first merged sensing signal of the previous period to track the movement of the objects around the vehicle. The tracking module 104 may further include a memory for storing the analysis result of the first merged sensing signal. By the tracking mentioned above, the tracking module 104 may generate the tracklet information including the three-dimensional spatial position and the velocity information of the object.

The time synchronization module 105 synchronizes the acquisition time point of the first sensing signal from the first time point to the acquisition time point of the second sensing signal (S150).

The time synchronization module 105 performs origin time shifting (OTS) in order to synchronize the first merged sensing signal and the second sensing image. The OTS is a correction of the velocity of the ego vehicle and means that the first merged sensing signal of the first time point ($t_1$) is moved to the third time point ($t_3$), which is the acquisition time point of the second sensing signal, by reflecting the movement of the ego vehicle.

The step of synchronizing the acquisition time point of the first sensing signal from the first time point to the acquisition time point of the second sensing signal (S150) includes adjusting the positions of the plurality of points based on the acquisition time point of the second sensing signal by using the velocity information and the position information of the vehicle provided by the position sensor. Each point of the first merged sensing signal may be moved from $pv_{t_1}(T_{t_1})$ to $pv_{t_3}(T_{t_3})$, which is a position corresponding to the third time point ($t_3$) that is the acquisition time point of the second sensing signal.

Next, the time synchronization module 105 compensates for the movement of objects around the vehicle in the first sensing signal according to the tracklet information (S160).

The time synchronization module 105 performs tracklet movement compensation (TMC) to synchronize the first merged sensing signal and the second sensing image. The TMC is a correction of the movement of the moving object and corresponds to correction that moves the position of the tracklet by reflecting the movement of the tracklet. As described above, the tracklet is acquired at the second time point ($t_2$), and the current reference time corresponds to the third time point ($t_3$). Thus, it is required to make correction in consideration of the change of position caused by continuous movement of the tracklet. Namely, the TMC makes correction for the movement of the tracklet as much as a time difference of $t_3-t_2$. The position of the tracklet to which vehicle velocity is corrected by means of the OTS is corrected from to $pv_{t_3}(T_{t_2})$ to $pv_{t_3}(T_{t_3})$ by means of the TMC.

Here, the plurality of acquisition points included in the first sensing signal are different from each other within the first acquisition time period, and the time synchronization module 105 may record the acquisition time points of the plurality of points.

Before performing the step of compensating for the movement of objects around the vehicle in the first sensing signal according to the tracklet information (S160), the time synchronization module may further perform the step of calculating the time difference between each of the acquisition time points of the plurality of points and the acquisition time point of the second sensing signal. Namely, the step of compensating for the movement of objects around the vehicle in the first sensing signal according to the tracklet information (S160) may compensate for the movements of the objects around the vehicle according to the calculated time difference.

Here, the data processing method for the fusion of multiple heterogeneous sensors according to this embodiment may further include the step of removing noise caused by interference generated between the plurality of first sensors at the first sensing signal.

Here, the step of removing noise caused by interference generated between the plurality of first sensors at the first sensing signal includes the steps of defining a region where direct interference may occur between the plurality of first sensors and filtering the direct interference at the points within the region in consideration of the acquisition time period of the plurality of points included in the region, and defining a time when indirect interference may occur between the plurality of first sensors and filtering the indirect interference in consideration of the positions of the plurality of points included in the time All of the disclosed methods and procedures described in this disclosure can be implemented, at least in part, using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

While the present disclosure has been described with reference to the embodiments, it will be understood by those skilled in the art that various changes and modifications can be made without departing from the scope of the present disclosure as set forth in the appended claims.

What is claimed is:

1. A data processing system for the fusion of multiple heterogeneous sensors, comprising:
   a plurality of first sensors configured to respectively generate a first sensing signal by sensing a surrounding environment of the vehicle during a first acquisition time period, the first sensing signal comprising a plurality of points including information about a three-dimensional spatial location of the surrounding environment of the vehicle;
   a second sensor different from the first sensor and configured to generate a second sensing signal by sensing the surrounding environment of the vehicle;
   a point cloud generation module comprising a merged point cloud generation unit configured to specify an acquisition time point of the plurality of first sensing signals provided by the plurality of first sensors as a first time point within the first acquisition time period, generate a plurality of corrected first sensing signals in which positions of the plurality of points are adjusted based on the specified first time point, and generate a first merged sensing signal by merging the plurality of corrected first sensing signals;
   a tracking module configured to generate tracklet information by tracking movements of objects around the vehicle based on the first merged sensing signal; and
   a time synchronization module comprising an origin time shifting (OTS) unit configured to synchronize the acquisition time point of the first sensing signal from the first time point to an acquisition time point of the second sensing signal, and a tracklet movement compensation (TMC) unit configured to compensate for the movements of the objects around the vehicle at the first sensing signal according to the tracklet information.

2. The data processing system for the fusion of multiple heterogeneous sensors according to claim 1,
   wherein the point cloud generation module further includes an interference filter unit configured to remove noise caused by interference generated between the plurality of first sensors at the first sensing signal.

3. The data processing system for the fusion of multiple heterogeneous sensors according to claim 2,
   wherein the interference filter unit performs:
   defining a region where direct interference probably occurs between the plurality of first sensors and filtering the direct interference inside the region in consideration of the acquisition time period of the plurality of points included in the region; and
   defining a time when indirect interference probably occurs between the plurality of first sensors and filtering the indirect interference in consideration of the positions of the plurality of points included in the time.

4. The data processing system for the fusion of multiple heterogeneous sensors according to claim 1, further comprising:
   a position sensor configured to acquire velocity information and position information of the vehicle,
   wherein the merged point cloud generation unit generates the plurality of corrected first sensing signals based on the velocity information and the position information of the vehicle provided by the position sensor, and
   wherein the OTS unit adjusts the positions of the plurality of points based on the acquisition time point of the second sensing signal by using the velocity information and the position information of the vehicle provided by the position sensor.

5. The data processing system for the fusion of multiple heterogeneous sensors according to claim 1,
   wherein the plurality of points included in the first sensing signal have different acquisition time points from each other within the first acquisition time period,
   wherein the time synchronization module further includes a time difference calculation unit configured to calculate a time difference between each of the acquisition time points of the plurality of points and the acquisition time point of the second sensing signal.

6. The data processing system for the fusion of multiple heterogeneous sensors according to claim 5,
   wherein the TMC unit compensates for the movements of the objects around the vehicle according to the time difference calculated by the time difference calculation unit.

7. The data processing system for the fusion of multiple heterogeneous sensors according to claim 1,
   wherein the second sensor is different from the first sensor in terms of a sensing signal acquisition manner and/or a sensing signal generating time point.

8. The data processing system for the fusion of multiple heterogeneous sensors according to claim 7,
   wherein the first sensor is a light detection and ranging (LiDAR) sensor, and the second sensor is a camera.

9. A data processing method for the fusion of multiple heterogeneous sensors, comprising:
   by a plurality of first sensors, respectively generating a first sensing signal by sensing a surrounding environment of the vehicle during a first acquisition time period, the first sensing signal comprising a plurality of points including information about a three-dimensional spatial location of the surrounding environment of the vehicle;
   by a second sensor different from the first sensor, generating a second sensing signal by sensing the surrounding environment of the vehicle;
   by a point cloud generation module, specifying an acquisition time point of the plurality of first sensing signals provided by the plurality of first sensors as a first time point within the first acquisition time period, and generating a plurality of corrected first sensing signals in which positions of the plurality of points are adjusted based on the specified first time point;
   by the point cloud generation module, generating a first merged sensing signal by merging the plurality of corrected first sensing signals;

by a tracking module, generating tracklet information by tracking movements of objects around the vehicle based on the first merged sensing signal;

by a time synchronization module, synchronizing the acquisition time point of the first sensing signal from the first time point to an acquisition time point of the second sensing signal; and by the time synchronization module, compensating for the movements of the objects around the vehicle at the first sensing signal according to the tracklet information.

10. The data processing method for the fusion of multiple heterogeneous sensors according to claim 9, further comprising:

removing noise caused by interference generated between the plurality of first sensors at the first sensing signal.

11. The data processing method for the fusion of multiple heterogeneous sensors according to claim 10, wherein the step of removing noise caused by interference generated between the plurality of first sensors at the first sensing signal includes:

defining a region where direct interference probably occurs between the plurality of first sensors and filtering the direct interference inside the region in consideration of the acquisition time period of the plurality of points included in the region; and defining a time where indirect interference probably occurs between the plurality of first sensors and filtering the indirect interference in consideration of the positions of the plurality of points included in the time.

12. The data processing method for the fusion of multiple heterogeneous sensors according to claim 9, wherein the step of generating a plurality of corrected first sensing signals in which positions of the plurality of points are adjusted based on the specified first time point includes generating the plurality of corrected first sensing signals based on the velocity information and the position information of the vehicle provided by the position sensor, and wherein the step of synchronizing the acquisition time point of the first sensing signal from the first time point to an acquisition time point of the second sensing signal includes adjusting the positions of the plurality of points based on the acquisition time point of the second sensing signal by using the velocity information and the position information of the vehicle provided by the position sensor.

13. The data processing method for the fusion of multiple heterogeneous sensors according to claim 9, wherein the plurality of points included in the first sensing signal have different acquisition time points from each other within the first acquisition time period, and wherein the data processing method further comprises, by the time synchronization module, calculating a time difference between each of the acquisition time points of the plurality of points and the acquisition time point of the second sensing signal.

14. The data processing method for the fusion of multiple heterogeneous sensors according to claim 13, wherein the step of compensating for the movements of the objects around the vehicle at the first sensing signal according to the tracklet information includes compensating for the movements of the objects around the vehicle according to the calculated time difference.

15. The data processing method for the fusion of multiple heterogeneous sensors according to claim 9, wherein the second sensor is different from the first sensor in terms of a sensing signal acquisition manner and/or a sensing signal generating time point.

16. The data processing method for the fusion of multiple heterogeneous sensors according to claim 15, wherein the first sensor is a LiDAR sensor, and the second sensor is a camera.

17. At least one non-temporary computer-readable storage medium that stores computer-readable instructions so that the computer-readable instruction performs the steps of:

by a plurality of first sensors, respectively generating a first sensing signal by sensing a surrounding environment of the vehicle during a first acquisition time period, the first sensing signal comprising a plurality of points including information about a three-dimensional spatial location of the surrounding environment of the vehicle;

by a second sensor different from the first sensor, generating a second sensing signal by sensing the surrounding environment of the vehicle;

by a point cloud generation module, specifying an acquisition time point of the plurality of first sensing signals provided by the plurality of first sensors as a first time point within the first acquisition time period, and generating a plurality of corrected first sensing signals in which positions of the plurality of points are adjusted based on the specified first time point;

by the point cloud generation module, generating a first merged sensing signal by merging the plurality of corrected first sensing signals;

by a tracking module, generating tracklet information by tracking movements of objects around the vehicle based on the first merged sensing signal;

by a time synchronization module, synchronizing the acquisition time point of the first sensing signal from the first time point to an acquisition time point of the second sensing signal; and by the time synchronization module, compensating for the movements of the objects around the vehicle at the first sensing signal according to the tracklet information.

* * * * *